Jan. 22, 1963   R. R. BURDUE   3,074,588
SAFETY RADIATOR PRESSURE CAPS
Filed July 11, 1960
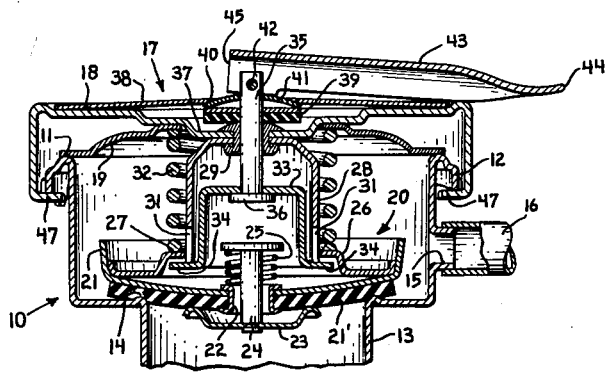
Fig. 1.
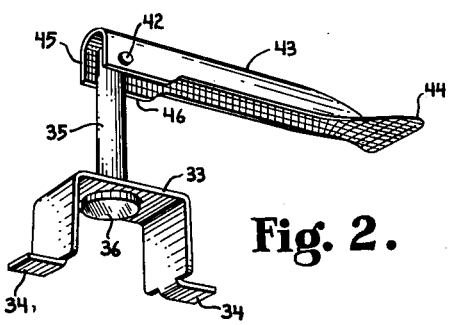
Fig. 2.
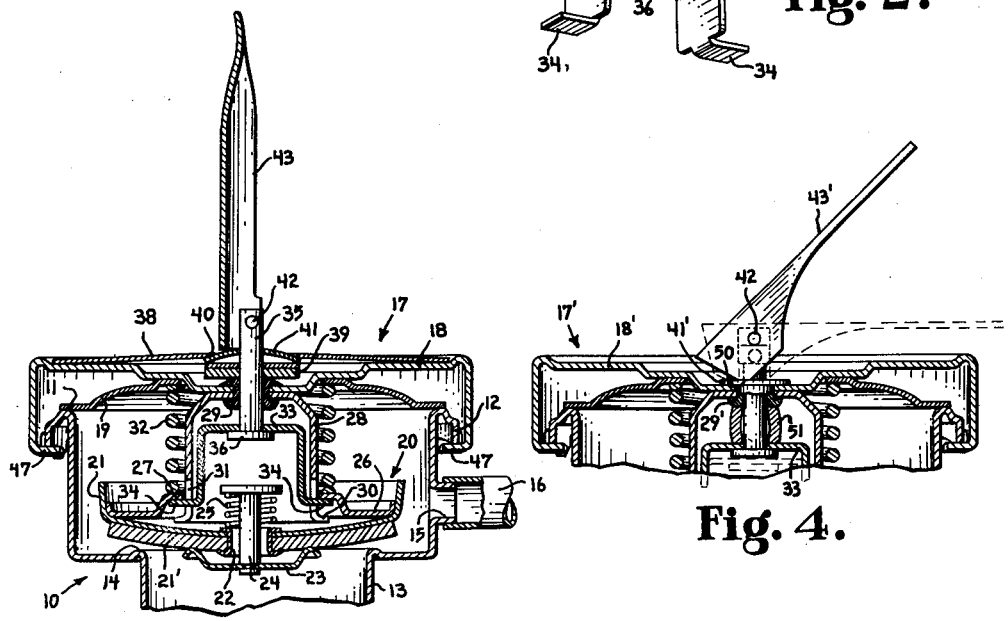
Fig. 3.
Fig. 4.
INVENTOR.
Roy R. Burdue
BY
Harold B. Hood
ATTORNEY United States Patent Office 3,074,588
Patented Jan. 22, 1963

3,074,588
SAFETY RADIATOR PRESSURE CAPS
Roy R. Burdue, Tucson, Ariz., assignor to Stant Manufacturing Company, Inc., Connersville, Ind., a corporation of Indiana
Filed July 11, 1960, Ser. No. 41,843
3 Claims. (Cl. 220—44)

The present invention relates to a safety pressure cap for automobile radiators, and is particularly concerned with an improved means for safely releasing pressure within the cooling system.

Many present day automobiles are equipped with cooling systems which are designed to operate under superatmospheric pressure and at temperatures above the atmospheric boiling point. The filler neck closure cap in such a system carries a valve which is resiliently held against a seat within the filler neck to maintain the design pressure; and if the cap is quickly removed from the filler neck at a time when the engine has been in operation for an appreciable period, the sudden release of the pressure within the cooling system frequently causes steam and water to spew from the filler neck, drenching and scalding the individual who has so removed the cap. While the retainer means for such caps are usually designed to provide an intermediate dwell position which is intended to inhibit such quick removal, the dwell position can be easily overcome, and the fact is that accidents of the character above described are not at all unusual.

Various expedients have been proposed for relieving the cooling system pressure before starting removal of the cap, and some of those expedients have been tried commercially; but, so far as I am advised, no one of them has met with any substantial degree of success since, for one reason or another, they have all been relatively ineffective to protect the careless or uninformed motorist or service station attendant.

The primary object of the present invention, then, is to provide improved means for effectively relieving the pressure within such a cooling system before starting removal of the closure cap.

A further object of the invention is to provide a device of the character described which shall include operating means of such character as to be ostentatiously visible to anyone approaching the cap, whereby his attention will be called to the presence of such pressure relieving means and he will be reminded to avail himself of the safety feature which has been provided.

A further object of the invention is to provide means of the character described which, through a quick and simple manipulation, while the closure cap remains in fully seated position, will lift the pressure valve affirmatively and bodily off its seat within the filler neck to establish open and unrestricted communication between the interior of the cooling system and the conventional overflow vent which is present in all such filler necks.

A further object of the invention is to provide an extremely simple and inexpensive mechanism, which is rugged and not liable to substantial wear in use, through which absolutely dependable protection against accidents of the above described character may be attained.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 1 is a vertical section through a cap constructed in accordance with the present invention, showing the parts in normal operative positions, with the pressure valve in position to seal an automobile cooling system for operation at a predetermined superatmospheric pressure;

FIG. 2 is a perspective view of the camming and valve-lifting elements of the cap illustrated in FIG. 1;

FIG. 3 is a view similar to FIG. 1 but showing the parts in pressure-releasing positions; and FIG. 4 is a fragmental section through a modified form of actuating means.

Referring more particularly to FIGS. 1 to 3, it will be seen that I have illustrated a conventional filler neck indicated generally by the reference numeral 10 and formed to provide an upper or diaphragm seat 11, a peripheral lip 12 with cammed lower edges, an extension 13 cooperatively associated with the conventional radiator tank (not shown) of an automobile cooling system, and a pressure valve seat 14. In accordance with conventional practice, the filler neck 10 is provided with an overflow vent 15 with which is connected an overflow conduit 16, the vent being positioned between the seats 14 and 11.

My safety pressure cap is indicated generally by the reference numeral 17 and comprises a cap body 18 within which is supported a flexible diaphragm 19 whose peripheral region engages the seat 11 when the cap is in position on the filler neck.

A pressure valve assembly indicated generally by the reference numeral 20 includes a valve carrier 21 upon which is supported a gasket 21' adapted sealingly to engage the seat 14 when the cap assembly is retainingly mounted on the filler neck. The carrier 21 and gasket 21' are, in the illustrated embodiment of the invention, centrally perforated as at 22 and a vacuum relief valve 23, whose stem 24 penetrates the said perforation, is arranged to close against the gasket 21' under the influence of a light, elevating spring 25 which will yield to a slight differential in pressure to relieve any vacuum which may arise within the cooling system.

The carrier 21 is supported from a pan 26 formed to provide a collar flange 27 which is loosely sleeved on a hollow, dome-shaped bell support 28. Said support 28 is secured by a hollow rivet 29 to the valve body 18 and terminates, at its lower end, in an outturned flange 30 which is interrupted, at diametrically opposite points, by longitudinally extending slots 31, 31 in the side wall of the bell 28. A coiled spring 32 is confined between the diaphragm 19 and the pan 26 to hold the diaphragm in place and resiliently to resist movement of the pan 26 toward the cap body 18. The collar flange 27, of course, cooperates with the bell flange 30 to limit movement of the valve assembly 20 away from the cap body under the influence of the spring 32.

Within the dome-shaped support 28 there is reciprocably received a yoke 33 terminating in oppositely radially projecting fingers 34 which project through, and are slidably guided in, the slots 31, said fingers extending radially outwardly into cooperative relationship with the collar flange 27. A stem 35, having an enlarged head 36, penetrates a central aperture in the base of the yoke 33, said stem head 36 providing a one-way driving connection between the stem 35 and the yoke 33. Said stem is proportioned and arranged to extend through the hollow rivet 29 and to a point above the top of the cap body 18. In the illustrated form of the invention, the cap body is formed with a central depressed region 37, and that region is spanned by a disc 38 having a central perforation 40. A gasket 39 closely surrounds the stem 35 within the depressed region 37 and is confined between the rivet 29 and a spring disc 41 spanning the perforation 40. The function of the gasket 39, of course, is to prevent the escape of vapor or liquid through the passage in which the stem 35 is reciprocably mounted.

A pivot pin 42 provides a hinged connection, upon an axis substantially parallel with the general plane of the cap body 18, between the stem 35 and an actuator 43 the distal end 44 of which preferably projects beyond the perimeter of the cap body 18. Said actuator lever is formed to provide a face 46 (FIG. 2) which, when the parts are in the positions of FIG. 1, bears against the disc 41; and a face 45 which, when the parts are in the positions of FIG. 3, bears against said disc, said face 45 being more remote from the axis of the pin 42 than is the face 46.

When the lever 43 is in the position of FIG. 1, the collar flange 27 may rest against the bell flange 30. In accordance with conventional practice, the cap 17 is provided with retainer fingers 47 cooperable with the cammed edges of the filler neck lip 12 to seat the cap on the filler neck in such a relationship that the gasket 21' is pressed against the seat 14 to lift the collar flange 27 slightly off the bell flange 30. In this position, as will be seen from examination of FIG. 1, the collar flange is also lifted above the fingers 34 of the yoke 33 which, when the lever 43 is in the position of FIG. 1, will be supported substantially at the level of the bell flange 30. It will be noted that the operative connection between the yoke fingers 34 and the collar flange 27 is effective only in one direction and that the valve assembly 20 may be so lifted without at all affecting the yoke 33, the stem 35 or the lever 43.

If, now, it is desired to remove the cap 17 from the filler neck 10, the first step will be to shift the lever 43 from its position of FIG. 1 to its position of FIG. 3. Thereby, the cam face 45 of the lever is brought into engagement with the disc 41 and the pin 42 is moved upwardly from its position of FIG. 1 to its position of FIG. 3, thereby similarly elevating the stem 35 and the yoke 33, said yoke carrying with it the valve assembly 20 to lift the gasket 21' bodily free of the seat 14, thereby placing the interior of the cooling system into direct communication with the atmosphere through the vent port 15 and overflow tube 16.

So long as the lever 43 stands in the position of FIG. 3, the valve assembly will be held in its position of proximity to the cap body 18 as illustrated in FIG. 3 and the cap assembly will be ineffective to seal the cooling system. So long as said cap assembly remains fully seated on the filler neck, however, the diaphragm 19 will continue to engage the seat 11, thereby preventing steam or water from escaping through the upper mouth of the neck. Now, with the lever 43 in the position of FIG. 3, the cap 17 may be removed from the filler neck, after equalization of the pressure within the cooling system with the atmosphere, without danger of accident.

The lever 43 may be returned to the position of FIG. 1, after the escape of excess pressure from the system, either before removal of the cap assembly from the filler neck, before return of the cap assembly to the neck, or after such return; but it will be apparent that the very presence of the lever 43, in its upstanding position as illustrated in FIG. 3 will be obvious to an attendant and will remind the attendant to return the lever to the position of FIG. 1 before putting the automobile back into use. Furthermore, the location and condition of the lever in the FIG. 3 position are such that it would be relatively difficult for an attendant to turn the cap into sealed position on the filler neck without either intentionally or inadvertently returning the lever 43 to its illustrated position. Quite obviously, once the corner of the lever between the cam face 45 and the cam face 46 moves to the left of the vertical plane including the axis of the hinge pin 42, the spring 32 will act to snap the lever 43 to its normal operating position as illustrated in FIG. 1.

In FIG. 4, I have illustrated a slight modification in which the lever 43' is formed with a cam face 50 so positioned relative to the hinge pin 42 that, when said cam face 50 is engaged with the head 41' of the rivet 29', the pressure valve will be held in pressure-releasing position but the lever 43' will stand at an angle of about 45° to the horizontal. This arrangement may be desirable in vehicles in which the clearance between the radiator cap and the vehicle hood, when the hood is closed, is very small. In such a situation, there is a possibility that, if an attendant should leave the lever 43 in the upstanding position of FIG. 3 and slam the hood closed, either the lever or the hood might be damaged. In the form of invention illustrated in FIG. 4, under such circumstances, engagement of the hood with the distal end of the lever 43' would simply swing the lever end downwardly to its dotted line position.

Additionally, in the form of invention illustrated in FIG. 4, the cap body 18' of the assembly 17' is not provided with a disc equivalent to that illustrated at 38 in FIG. 1, but the hollow rivet 29' is formed with an enlarged head 41' with which the cam faces of the lever 43' may cooperate; and a sleeve-like gasket 51 is interposed between the yoke 33 and the lower end of the rivet 29', the parts being so proportioned and designed that, when the lever is raised, the yoke will compress the gasket 51 to increase the effectiveness of its seal against the base of the rivet 29'.

I claim as my invention:

1. In a safety radiator pressure cap for use with an automobile radiator filler neck having a retainer lip, a pressure valve seat and an overflow vent between said lip and said seat, a cap body provided with means engageable with such a lip to retain said cap body in closing association with such a neck, a generally-cylindrical support fixedly depending from said cap body, provided at its distal end with stop means and formed with a pair of diametrically opposed, longitudinal slots, a pressure valve having an inturned flange loosely sleeved on said support between said stop means and said cap body for limited bodily reciprocation toward and away from said cap body, spring means interposed between said cap body and said valve and constructed and arranged resiliently to press said valve into sealing engagement with such a seat when said cap body is so retained, a stem reciprocably penetrating said cap body and having an inner portion disposed within said support and an outer portion disposed outside said cap body, said stem being provided with abutment means on its inner portion, a yoke slidably mounted on said stem between said abutment means and said cap body and within said support, said yoke being provided with oppositely-projecting fingers respectively penetrating said slots for cooperative engagement with that surface of said flange remote from said cap body, a lever, pivot means transaxially carried by the outer portion of said stem, one end of said lever being pivotally mounted on said pivot means, said one lever end being formed to provide a cam surface comprising a first portion which extends generally in the direction of length of said lever and a second portion which extends generally transverse to the length of said lever, said second cam portion being more remote from said pivot means than is said first cam portion, the parts being so proportioned and arranged that, when said cap body is so retained and the other end of said lever is closely adjacent said cap body, said first cam portion will engage said cap body and said valve will be resiliently pressed against such a seat, but when said other lever end is moved away from said cap body, said second cam portion will engage said cap body to lift said valve bodily off such seat and to hold said valve and said other lever end in their elevated positions.

2. In a safety radiator pressure cap for use with an automobile radiator filler neck having a retainer lip, a pressure valve seat and an overflow vent between said lip and said seat, a cap body provided with means engageable with such a lip to retain said cap body in closing association with such a neck, a generally-cylindrical support fixedly depending from said cap body, provided at its distal end with stop means and formed with a pair of diametrically opposed, longitudinal slots, a pressure valve having an inturned flange loosely sleeved on said support between said stop means and said cap body for limited bodily reciprocation toward and away from said cap body, spring means interposed between said cap body and said valve and constructed and arranged resiliently to press said valve into sealing engagement with such a seat when said cap body is so retained, a stem reciprocably penetrating said cap body and having an inner portion disposed within said support and an outer portion disposed outside said cap body, said stem being provided with abutment means on its inner portion, a yoke slidably mounted on said stem between said abutment means and said cap body and within said support, said yoke being provided with oppositely-projecting fingers respectively penetrating said slots for cooperative engagement with that surface of said flange remote from said cap body, pivot means transaxially carried by the outer portion of said stem, and a cam lever pivotally mounted on said pivot means and cooperable with said cap body to shift said stem axially, when the distal end of said lever is moved away from said cap body, to lift said valve bodily off such seat.

3. A safety pressure cap comprising a cap body, a generally-cylindrical support fixedly depending from said cap body, provided at its distal end with stop means and formed with a pair of diametrically opposed, longitudinal slots, a pressure valve having an inturned flange loosely sleeved on said support between said stop means and said cap body for limited bodily reciprocation toward and away from said cap body, a coiled spring sleeved on said support and confined between said cap body and said valve to urge said flange toward said stop means, a stem reciprocably penetrating said cap body and having an inner portion disposed within said support and an outer portion disposed outside said cap body, said stem being provided with abutment means on its inner portion, a yoke slidably mounted on said stem between said abutment means and said cap body and within said support, said yoke being provided with oppositely-projecting fingers respectively penetrating said slots for cooperative engagement with that surface of said flange remote from said cap body, pivot means transaxially carried by the outer portion of said stem, and a cam lever pivotally mounted on said pivot means and cooperable with said cap body to shift said stem axially, when the distal end of said lever is moved away from said cap body, to move said valve, against the tendency of said spring, toward said cap body.

References Cited in the file of this patent
UNITED STATES PATENTS

| | | |
|---|---|---|
| 1,284,063 | Davis | Nov. 5, 1918 |
| 1,544,727 | Del Mar | July 7, 1925 |
| 2,572,816 | Patrick | Oct. 23, 1951 |
| 2,596,070 | Friend et al. | May 6, 1952 |
| 2,792,964 | Reese et al. | May 21, 1957 |
| 2,964,214 | Stannard | Dec. 13, 1960 |